United States Patent
Han (10) Patent No.: US 8,107,018 B2
(45) Date of Patent: Jan. 31, 2012

(54) APPARATUS AND METHOD FOR PROVIDING IMAGE-CORRECTION FUNCTION IN PROJECTOR

(75) Inventor: Sang-Jun Han, Dongjak-gu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1239 days.

(21) Appl. No.: 11/730,794

(22) Filed: Apr. 4, 2007

(65) Prior Publication Data

US 2008/0036976 A1 Feb. 14, 2008

(30) Foreign Application Priority Data

Aug. 11, 2006 (KR) ........................ 10-2006-0076291

(51) Int. Cl.
*H04N 3/22* (2006.01)
*H04N 3/26* (2006.01)
(52) U.S. Cl. ....................................... 348/745; 348/806
(58) Field of Classification Search .................. 348/745, 348/746, 747, 806, 807; 353/69; 315/368.11, 315/368.12; *H04N 3/26, 3/23, 3/22, 3/223, H04N 3/227, 9/28*
See application file for complete search history.

(56) References Cited

U.S. PATENT DOCUMENTS

| 7,199,937 B2* | 4/2007 | Sakai .............................. 359/649 |
| 2005/0068501 A1* | 3/2005 | Nonaka et al. .................. 353/30 |
| 2007/0110304 A1* | 5/2007 | Tsukada ....................... 382/167 |

FOREIGN PATENT DOCUMENTS

| KR | 10-1997-0032036 A | 6/1997 |
| KR | 10-2001-0051469 A | 6/2001 |
| KR | 10-2004-0056489 A | 7/2001 |

* cited by examiner

*Primary Examiner* — Sherrie Hsia
(74) *Attorney, Agent, or Firm* — Sughrue Mion, PLLC (57) ABSTRACT

Provided is an apparatus and method for providing image-correction function in a projector. The apparatus includes an image-inputting module which receives a photographed image of a surface on which an image is to be projected; an image-analyzing module which analyzes an input state of the surface and calculates a color difference as a correction amount; an image-correcting module which applies the correction amount to the image projected onto the surface; and an image-projecting module which projects the corrected image onto the surface.

23 Claims, 8 Drawing Sheets

APPARATUS AND METHOD FOR PROVIDING IMAGE-CORRECTION FUNCTION IN PROJECTOR

CROSS-REFERENCE TO RELATED APPLICATION

This application is based on and claims priority from Korean Patent Application No. 06-0076291 filed on Aug. 11, 2006, in the Korean Intellectual Property Office, the disclosure of which is incorporated herein in its entirety by reference.

BACKGROUND OF THE INVENTION

1. Field of the Invention

Apparatuses and methods consistent with the present invention relate to providing correctional image function in a projector, and more particularly, to improving the picture quality of a portable projector or a mobile terminal with a built-in projector by photographing and analyzing the projection screen surface, and correcting the image according to the analyzed state of the projection screen surface.

2. Description of the Related Art

Related art projectors receive signals of various image devices, such a TV, VCR, PC and camcorder, magnify the image using a lens, and display the image on a screen. That is, the related art projector is an improved epidiascope.

Compared to a beam projector with three electron guns, related art liquid crystal displays (LCD) and digital light-processing (DLP) projectors have a function for automatically screening an optimal picture only by connecting the image devices without performing setting. Thus, they are widely supplied for presentations in offices and home theaters. Since the simplification of the inner components is now possible, related art projector devices are becoming smaller.

Now that portable media players with built-in projectors are available, it is possible to watch movies or conduct a presentation any place using the projection function.

Portable projectors and portable media players with built-in projectors project an image onto a wall or ceiling. However, the image can be distorted due to the color or pattern of the screen.

Figure 1:
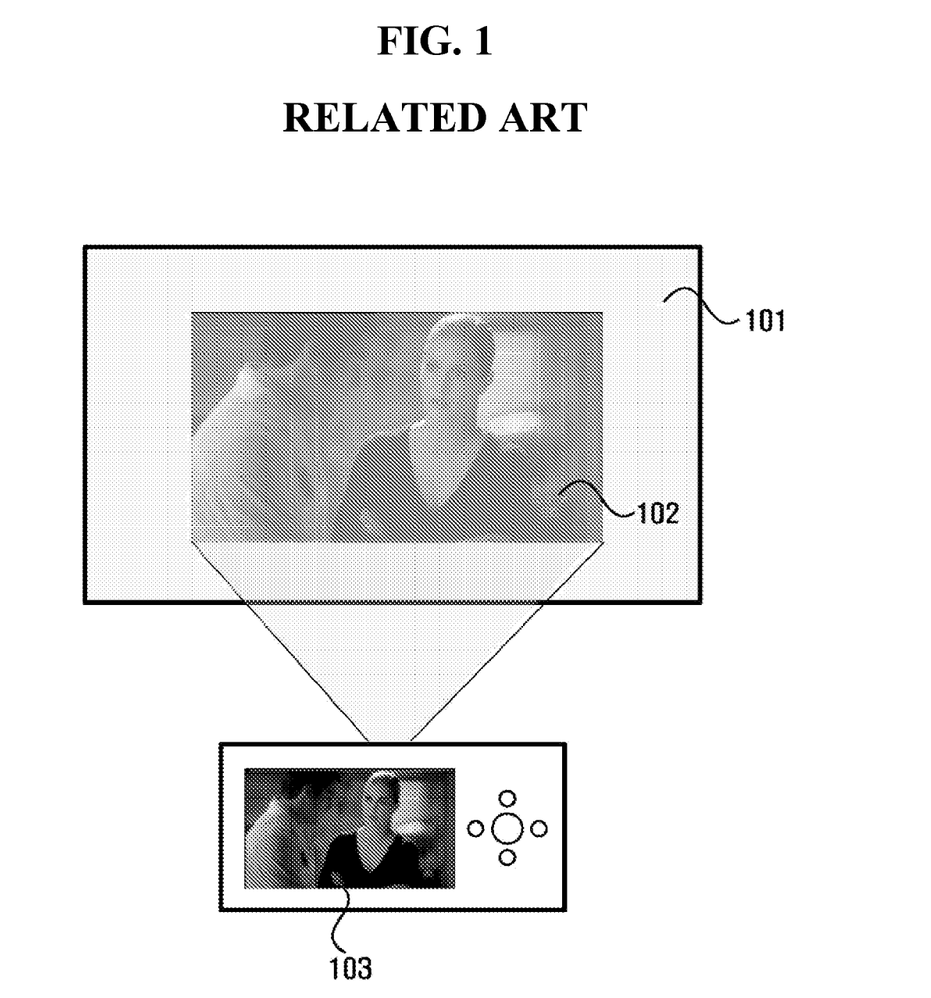
FIG. 1 illustrates a related art image projected onto a yellow screen.

FIG. 1 illustrates a related art image projected onto a yellow screen. When the color of the wall or ceiling of the screen 101 is yellow, an image 102 projected onto the screen 101 (wall or ceiling) will have a distorted color compared to the original image 103 due to the yellow hue of the screen 101.

A variety of related art suggestions have been made for improving the picture quality of the projected image by obtaining the state of the screen of a projector (for example, "A System and Method for Correcting Image Distortion on Arbitrary Projection Plane" disclosed in Korean Unexamined Patent Publication No. 2004-056489).

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides an image that may have a higher picture quality, by correcting the image according to the state of screen through an apparatus and method for providing image-correction function in the projector.

According to an aspect of the present invention, there is provided an apparatus for providing correctional image function in a projector, the apparatus including a screen-image-inputting module which receives the photographed image of the screen, an image-analyzing module which analyzes the input state of the screen, and calculates the color difference as a correction amount, an image-correcting module which applies the calculated correction amount to an image projected onto the screen, and an image-projecting module which projects the corrected image onto the screen.

According to another aspect of the present invention, there is provided a method of providing a correctional image function in projector, the method including receiving the photographed image of the screen to which a image is projected, analyzing the input state of the screen and calculating the color difference as a correction amount, applying the calculated correction amount to an image to be projected onto the screen, and projecting the corrected image onto the screen.

BRIEF DESCRIPTION OF THE DRAWINGS

The above and other aspects of the present invention will become apparent by describing in detail exemplary embodiments thereof with reference to the attached drawings, in which.

DETAILED DESCRIPTION OF THE EXEMPLARY EMBODIMENTS

The present invention will now be described more fully with reference to the accompanying drawings, in which exemplary embodiments of the invention are shown.

Aspects and features of the exemplary embodiments, and methods of accomplishing the same may be understood more readily by reference to the following detailed description and the accompanying drawings. The aspects may be embodied in many different forms and should not be construed as being limited to the exemplary embodiments. Rather, these exemplary embodiments are provided so that this disclosure will be thorough and complete and will fully convey the claimed invention to those skilled in the art, and the present invention will only be defined by the appended claims. Like reference numerals refer to like elements throughout the specification.

It will be understood that each block of the flowchart illustrations, and combinations of blocks in the flowchart illustrations can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded into a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

Further, each block of the flowchart illustrations may represent a module, segment, or portion of code, which comprises one or more executable instructions for implementing the specified logical function(s).

It should also be noted that in some alternative implementations, the functions noted in the block may occur out of order. For example, two blocks shown in succession may in fact be executed substantially concurrently or the block may sometimes be executed in reverse order, depending upon the functionality involved.

Figure 2:
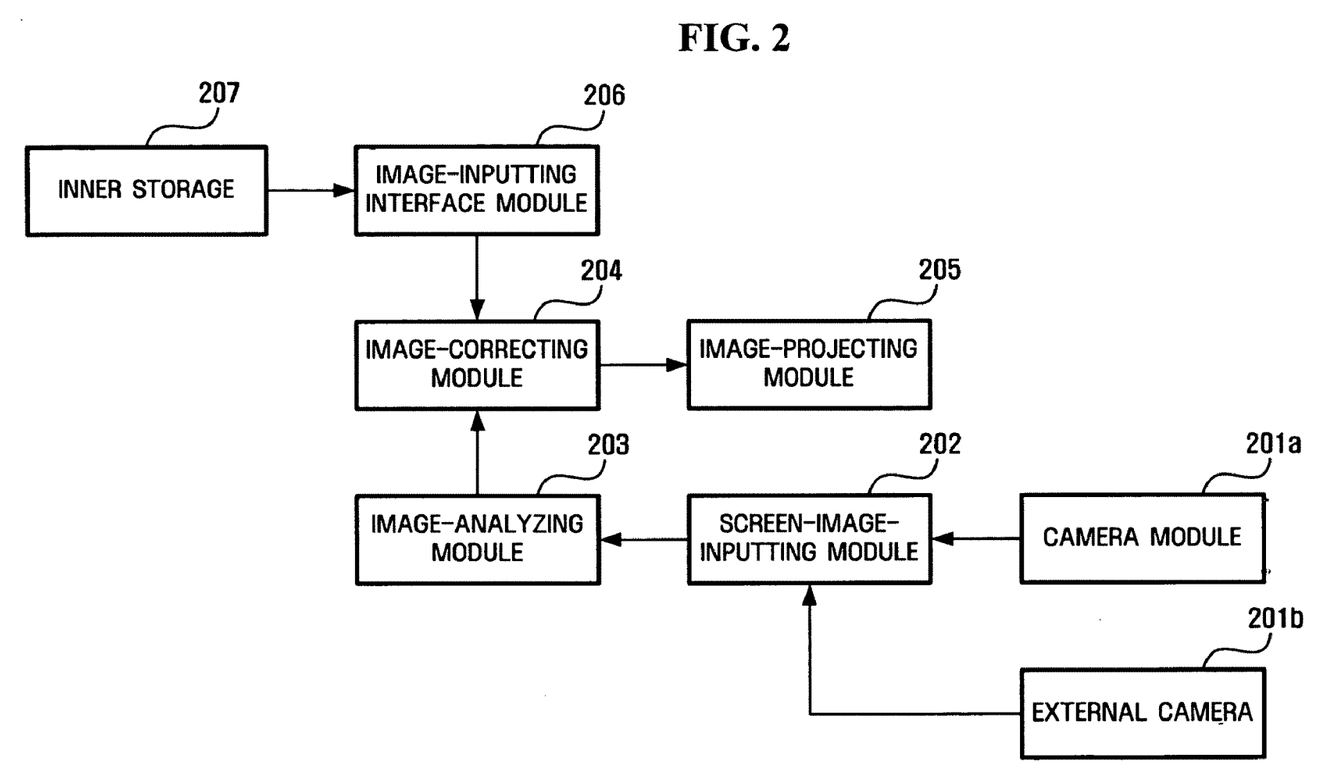
FIG. 2 is a block diagram illustrating a configuration of an apparatus which provides a correctional image function in a projector according to an exemplary embodiment of the present invention.

FIG. 2 is a block diagram illustrating configuration of an apparatus which provides a image-correction function in a projector according to an exemplary embodiment of the present invention.

The apparatus for providing a image-correction function in a projector includes a camera module 201a which photographs a surface that may act as a screen, an screen-image-inputting module 202 which receives an image of the screen photographed by the camera module 201a, an image-analyzing module 203 which analyzes the input state of the screen and extracts its correction amount, an image-correcting module 204 which applies the extracted correction amount to the input image, an image-projecting module 205 which projects the corrected image to the screen, an image-inputting interface module 206 in which the image projected onto the screen is input, and an inner storage 207 which provides an image to the image-inputting interface.

The term "module", as used herein, means, but is not limited to, a software or hardware component, such as a Field Programmable Gate Array (FPGA) or an Application Specific Integrated Circuit (ASIC), which performs certain tasks. A module may be configured to reside on the addressable storage medium and to execute on one or more processors. Thus, a "unit" may include, by way of example, components, such as software components, object-oriented software components, class components and task components, process, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

The camera module 201a photographs a surface. Here, the mobile terminal refers to the terminal which can be carried or moved, such as a mobile phone, personal digital assistant (PDA), portable multimedia player (PMP), digital camera, or camcorder. However, the exemplary embodiment is not limited to these examples, and may include other examples as may be envisioned by one skilled in the art.

The camera module 201a can be built in the portable projector, or a mobile terminal can have a built-in projector, and the image of the screen captured by the built-in camera module 201a is input through the screen-image-inputting module 202. However, the exemplary embodiment is not limited to these examples, and may include other examples as may be envisioned by one skilled in the art.

The screen-image-inputting module 202 is a region to which an image of the screen photographed by the camera module 201a is input. If the camera module 201 is unavailable due to, for example but not by way of limitation, the wrong operation or in case of a portable projector without the built-in camera and a mobile terminal in which a projector without camera is built therein, an image of the screen which was photographed by an external camera 201b can be input.

Although the camera module 201a is not limited to a portable projector or a mobile terminal with a built-in projector in the present invention, the camera module 201a may be installed in a position with an angle or height which allows an image of the surface screened from a portable projector or a mobile terminal with a built-in projector to be photographed most effectively because the color of the image of the screen could be different from the real color depending on the angle or height of the camera which photographs the surface.

The image-analyzing module 203 analyzes the state of the screen photographed by the camera module 201a and extracts a correction amount. The state of the screen contains the color information of the screen, including coordinates information of the screen and one or more color components among red, green, blue on the coordinates.

For reference, the correction can be calculated into a single pixel unit, and the identical correction amount can be applied to the whole screen.

For example, if the color on the screen is equal, the substantially identical correction amount can be applied. As depicted in FIG. 2, if the color of the screen contains patterns, the correction amount is applied.

In the exemplary embodiments, it is assumed that the correction amount is calculated for a single pixel unit.

The color information on the screen according to an exemplary embodiment includes the coordinates of specific pixel on the screen (hereinafter, referred to as "Scr"): (x, y; $0<x<X$; $0<y<Y$).

A red component of the coordinates can be displayed as Scr(x, y)·Red, a green component of the coordinates can be displayed as Scr(x, y)·Green, and a blue component of the coordinates can be displayed as Scr(x, y)·Blue.

X and Y indicate the resolution of an image projected onto the screen. For example, if the resolution of an image provided by a projector is 800×600, X is 800 and Y is 600.

The image-analyzing module 203 analyzes the state of the screen and calculates the correction amount. The correction amount of the coordinates of the specific pixel on the screen is displayed as Delta (x,y).

Meanwhile, the correction amount Delta (x,y) is calculated as a difference between color information of a standard and that of the screen by the image-analyzing module 203.

Here, the color information of a standard implies the color information which can be obtained when the ideal screen is photographed, including standard color coordinates: normal (hereinafter, indicated as "Norm") (x, y) ($0<x<X$, $0<y<Y$).

A standard red component can be displayed as Norm(x, y)·Red, a standard green component can be displayed as Norm(x,y)·Green and a standard blue component can be displayed as Norm(x, y)·Blue.

X and Y indicate the resolution of an image projected onto the screen. For example, if the resolution of an image provided by a projector is 800×600, X is 800 and Y is 600.

Therefore, the image-analyzing module 203 extracts correction amount on the specific coordinates (x,y) of the screen according to the following equations.

Delta(x,y)·Red=Norm(x,y)·Red−Src(x,y)·Red

Delta(x,y)·Green=Norm(x,y)·Green−Src(x,y)·Green

Delta(x,y)·Blue=Norm(x,y)·Blue−Src(x,y)·Blue

For reference, color information of the ideal screen area is not limited to the specific value, and it can be changed depending on the company manufacturing the portable projector or mobile terminal.

The image of the photographed surface can be input after photographing the image of the screen through the camera module 201a or the external camera 201b first as mentioned above, and the image of the photographed standard still image can be input after projecting the standard still image to the screen from the image-projecting module 205 first and photographing the standard still image projected onto the screen through the camera module 201a or the external camera 201b.

Figure 3:
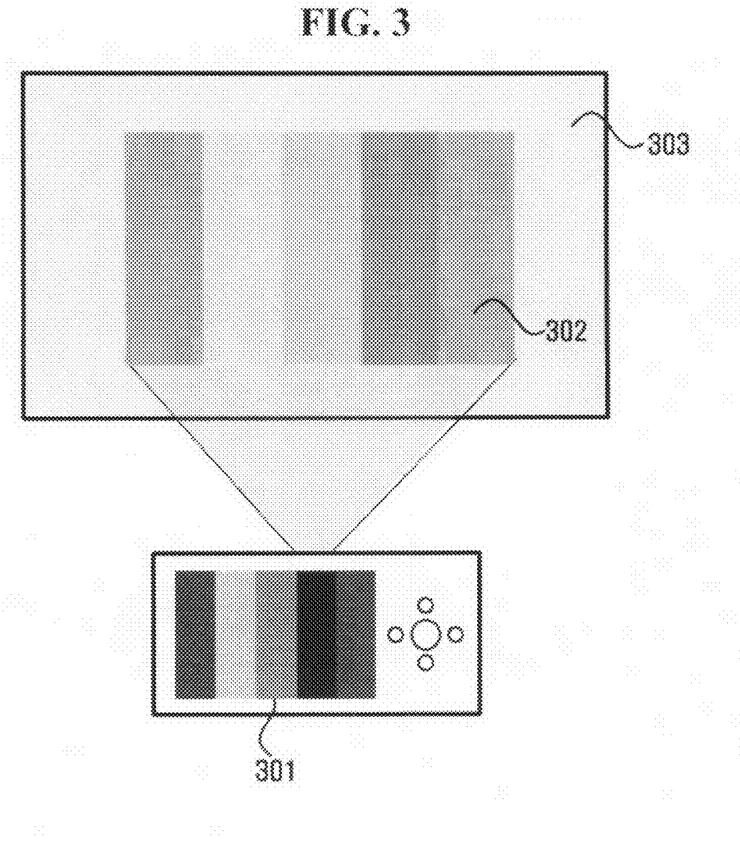
FIG. 3 illustrates a standard still image according to another exemplary embodiment of the present invention.

FIG. 3 illustrates a standard still image according to another exemplary embodiment of the present invention. A standard still image 301 implies a group of a representative color as illustrated in FIG. 3. When the ideal color coordinates of the standard still image 301 is assumed as Norm2(x,y), a red component of the standard still image can be displayed as Norm2(x, y)·Red and a green component of the standard still image can be displayed as Norm2(x, y)·Green and a blue component of the standard still image can be displayed as Norm2(x, y)·Blue.

X and Y indicate the resolution of an image projected onto the screen 303. For example, if the resolution of an image provided by a projector is 800×600, X is 800 and Y is 600.

When the coordinates on the specific pixel, among the color information are assumed to be Scr2(x, y) (0<x<X, 0<y<Y), a red component on the coordinates can be displayed as Scr2(x, y)·Red, and a green component on the coordinates can be displayed as "Scr2(x, y)·Green" and a blue component on the coordinates can be displayed as "Scr2(x, y)·Blue".

X and Y indicate the resolution of an image projected onto the screen 303. For example, if the resolution of an image provided by a projector is 800×600, X is 800 and Y is 600.

Therefore, the image-analyzing module 203 extracts correction amount on the specific coordinates (x,y) of the screen 303 according to the following equations.

Delta(x,y)·Red=Norm2(x,y)·Red−Scr2(x,y)·Red

Delta(x,y)·Green=Norm2(x,y)·Green−Scr2(x,y)·Green

Delta(x,y)·Blue=Norm2(x,y)·Blue−Scr2(x,y)·Blue

Figure 4:
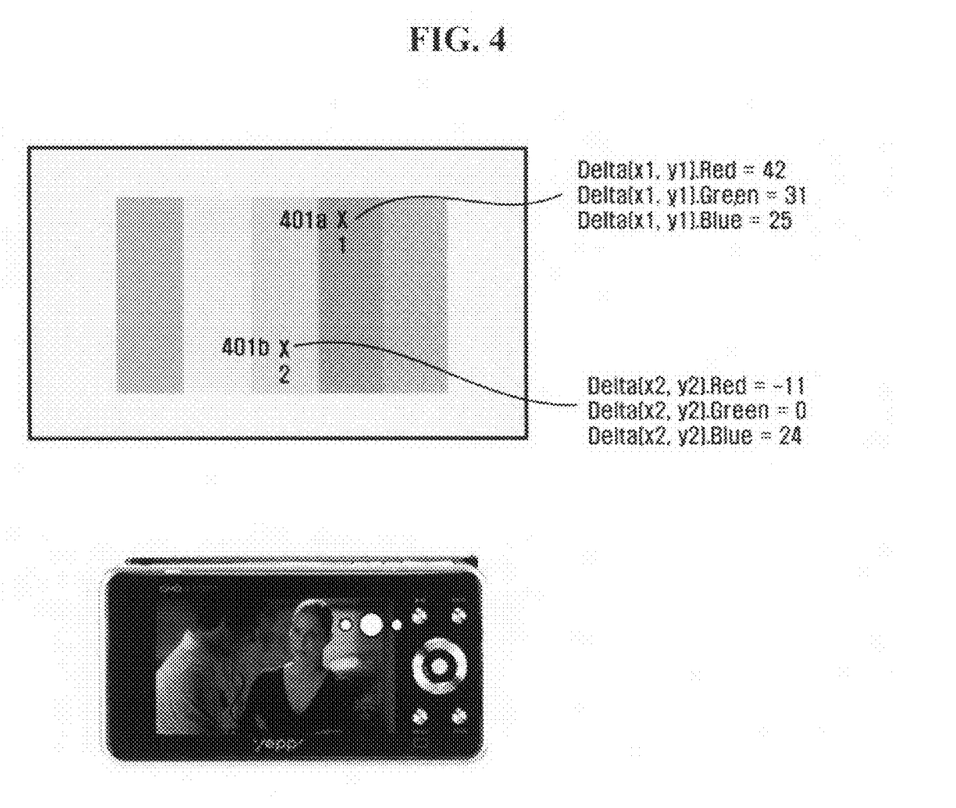
FIG. 4 illustrates calculating correction amount on specific coordinates of the screen.

FIG. 4 illustrates calculating a correction amount for specific coordinates of the screen. The image-analyzing module 203 respectively indicates correction amount on the first coordinates (x1,y1) 401a and the second coordinates (x2,y2) 401b of the screen 301 photographed by the camera module 201a.

The correction amount may be the value of "+" and "−", the "+" indicating increase of the size of the corresponding color component and the "−" indicating decrease of the size of the corresponding color component.

The image-correcting module 204 implies the correction amount extracted from the image-analyzing module 203 to an image input into a portable projector or a mobile terminal with a built-in projector.

When the coordinates on the specific pixel among the color information of the input image in the present invention is assumed as Input(x, y) (0<x<X, 0<y<Y), a red component on the coordinates can be displayed as Input(x, y)·Red and a green component on the coordinates can be displayed as Input(x, y)·Green and a blue component on the coordinates can be displayed as Input(x, y)·Blue.

X and Y indicate the resolution of an image projected onto the screen. For example, if solution of an image provided by a projector is 800×600, X is 800 and Y is 600.

Therefore, when the color information of the corrected image, wherein the correction amount is applied to the input image by the image-correcting module 204, is indicated with the coordinates of project(x, y), the equation Project(x, y)=Input(x, y)+Delta(x, y) is used.

That is, the value of the color information of the corrected image is obtained by adding the color information of the input image to the correction amount.

The image-correcting module 204 applies the correction amount to the original image input to the image-inputting interface module 206, and each color component (red, green, blue) of the original image to which the correction amount is applied are projected onto the screen through the image-projecting module 205.

The image correction can be achieved by the image-correcting module 204 using equation 1:

$$C = VP + E$$

$$C = \begin{bmatrix} C_R \\ C_G \\ C_B \end{bmatrix} \quad V = \begin{bmatrix} V_{RR} & V_{RG} & V_{RB} \\ V_{GR} & V_{GG} & V_{GB} \\ V_{BR} & V_{BG} & V_{BB} \end{bmatrix} \quad P = \begin{bmatrix} P_R \\ P_G \\ P_B \end{bmatrix} \quad E = \begin{bmatrix} E_R \\ E_G \\ E_B \end{bmatrix}$$

C is a correction target image, P is an image projected from the image-projecting module 205, V is a color mixture determinant, E is an environment light, and E can be obtained when P is 0, that is, a black color image is projected.

In V, $V_{RR}$, $V_{GG}$, $V_{BB}$ indicate pure red, green, blue, and $V_{RG}$, $V_{RB}$, $V_{GR}$, $V_{GB}$, $V_{BR}$, $V_{BG}$ indicate that the colors overlap.

To correct a target image as depicted in FIG. 1, the correction should be performed considering the mixture of other color components as well as the corresponding color component.

Figure 5:
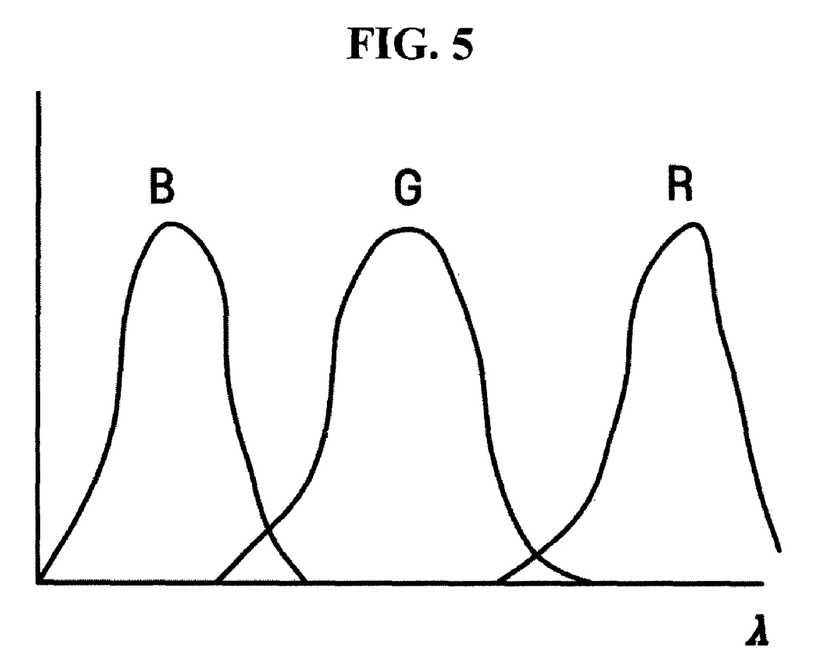
FIG. 5 illustrates a component of an image color.

For example, the red, green, and blue components of the screen photographed by a camera have the components overlapped with other color components, as illustrated in FIG. 5.

Figure 6A:
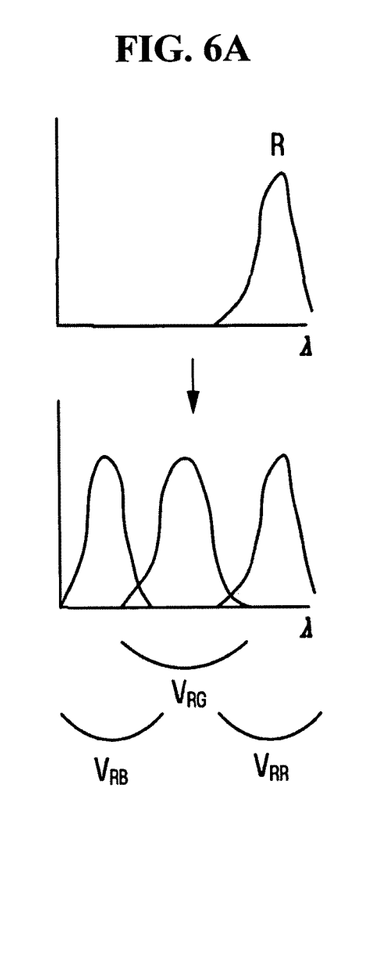
FIGS. 6A, 6B and 6C illustrate a color component and an overlapped component.
Figure 6B:
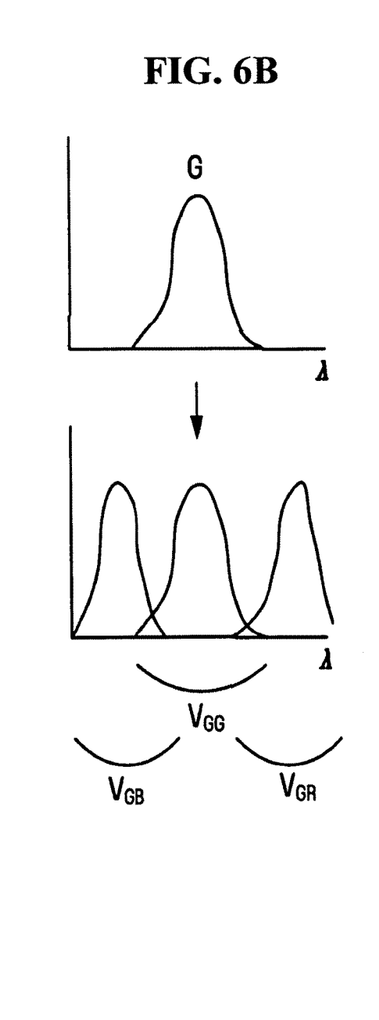
Figure 6C:
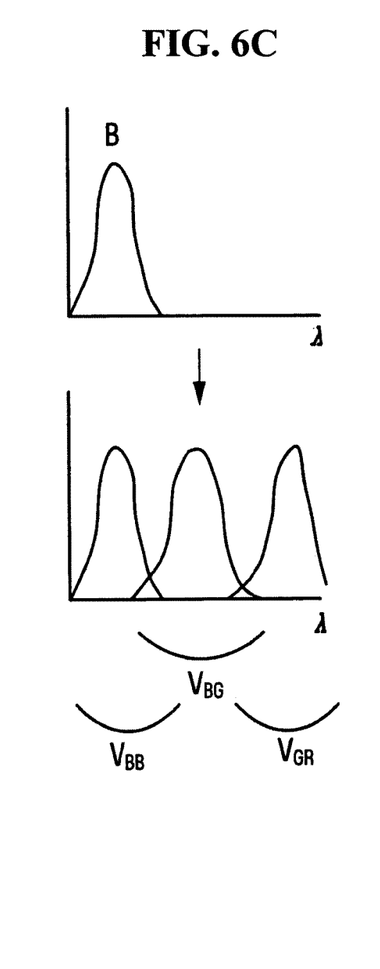

As illustrated in FIG. 6A, in a camera there is a red component $V_{RR}$ a component $V_{RG}$ in which a red component $V_{RR}$ and a green component $V_{GG}$ overlap, and a component $V_{RB}$ in which a red component $V_{RR}$ and a blue component $V_{BB}$ overlap. In addition, as illustrated in FIGS. 6B and 6C, in a camera there is a component in which a green component $V_{GG}$ and a blue component $V_{BB}$ overlap.

To perform image correction based on the correction amount, a process of separating the overlapped color components is required. To accomplish this, a dichroic filter or a dichroic mirror may be used.

In case of an LCD projector, the dichroic filter or dichroic mirror may be installed on each color liquid crystal panel projecting each color component to the screen. In case of a DLP projector, they can be installed on a digital mirror device (DMD). However, this is just for understanding of the exemplary embodiment and the installed structure and position can be changed depending on its purpose or requirement.

The image-projecting module 205 projects the image corrected in the image-correcting module 204 to the screen.

For example, if the screen, such as a wall or ceiling (but not limited thereto), is yellow, the shown image projected onto the yellow screen is influenced by the yellow color of the screen. However, through an apparatus according to the exemplary embodiment, an image with a good picture quality can be achieved by correcting the color influenced by the yellow screen.

The image-projecting module 205 can be understood as a projector, and related art projectors include the LCD projector, the DLP projector, and the cathode ray tube (CRT) projector. However, the present invention is not limited thereto.

The image-inputting interface module 206 is a region in which an image projected onto the screen is input. When a storage 207 exists in a portable projector or a mobile terminal with a built-in projector, the image-inputting interface module 206 receives an image provided by the inner storage 207.

If the space of the storage 207 is not large enough or an additional storage does not exist, the image stored in the external device may be input through the image-inputting interface module 206.

An interface used to connect the image-inputting interface module 206 and the device which transmits the image stored in the external device to a portable projector or a mobile terminal with a built-in projector includes various interfaces such as Bluetooth, IEEE 1394, and USB. However, the interface is not limited thereto.

The external device refers to devices like a PC, a portable hard drive, a PDA, a PMP, and a camcorder, but the present invention is not limited thereto.

Figure 7:
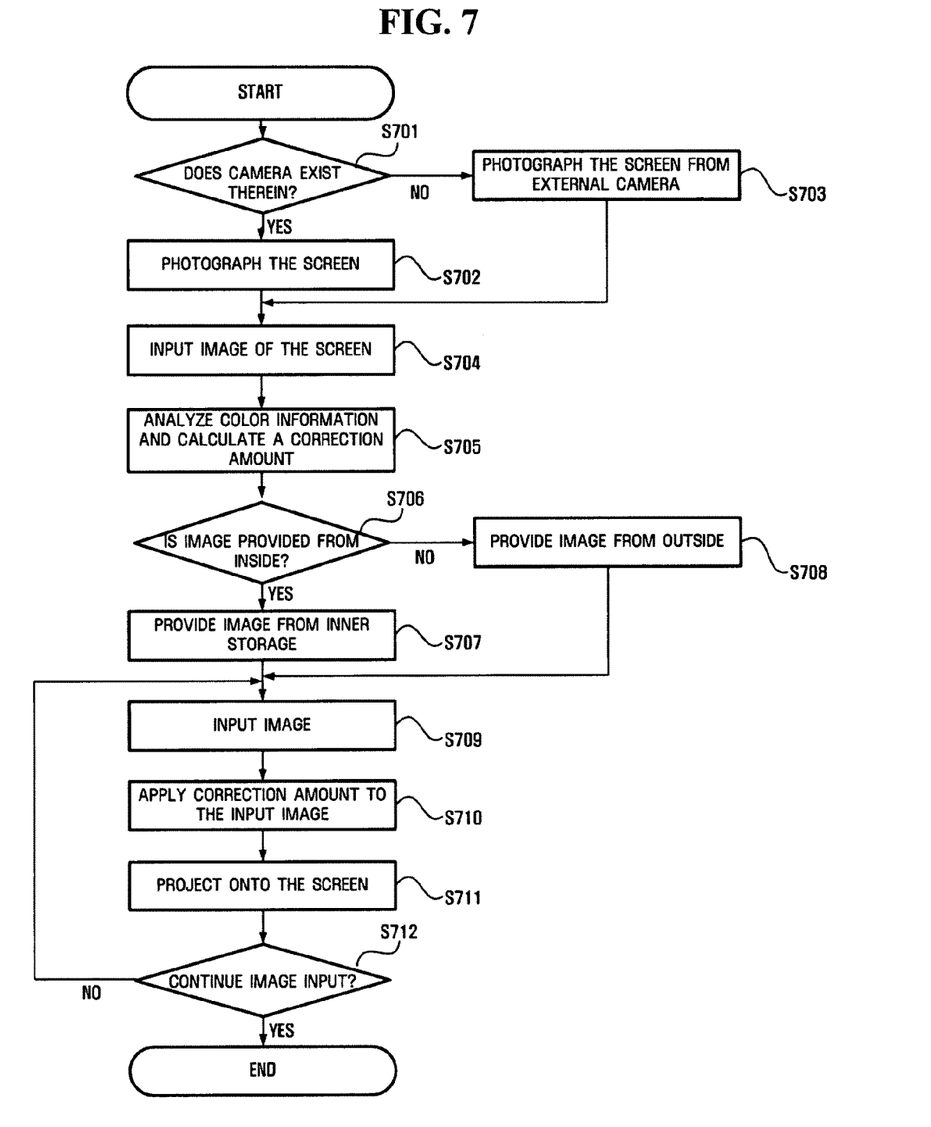
FIG. 7 is a flowchart illustrating a process of a method of providing a image-correction function in a projector according to an exemplary embodiment of the present invention.

FIG. 7 is a flowchart illustrating a process of a method of providing an image-correction function in a projector according to an exemplary embodiment of the present invention.

First, the operation is divided depending on whether a camera is installed in a portable projector or a mobile terminal with a built-in projector (S701).

If the camera is installed, the screen is photographed by the camera module 201*a* S702), and the photographed image of the screen is input through the screen-image-inputting module 202 (S704).

If the camera is not installed in operation S701, the screen is photographed by the external camera 201*b* (S703), and the photographed image of the screen is input through the screen-image-inputting module 202.

After S704, the image-analyzing module 203 analyzes the color information of the image on the screen input in operation S704 and calculates the correction amount (S705).

The operation is divided again depending on whether an image has been provided (S706).

If an image is provided from the storage 207 having a size, the image is input through the trough the image-inputting interface module 206.

If an image is provided from the external device (S708), the image is input through the image-inputting interface module 206 as well (S709).

After operation S709, the image-correcting module 204 applies a correction amount to the input image (S710).

After S710, the corrected image is projected onto the screen through the image-projecting module 205 (S711).

After operation S711, depending if the next image data is continuously input (S712), the process of inputting and correcting an image data is repeated or, if no more data is input or a user terminates the operation of the projector, the process is terminated.

Figure 8:
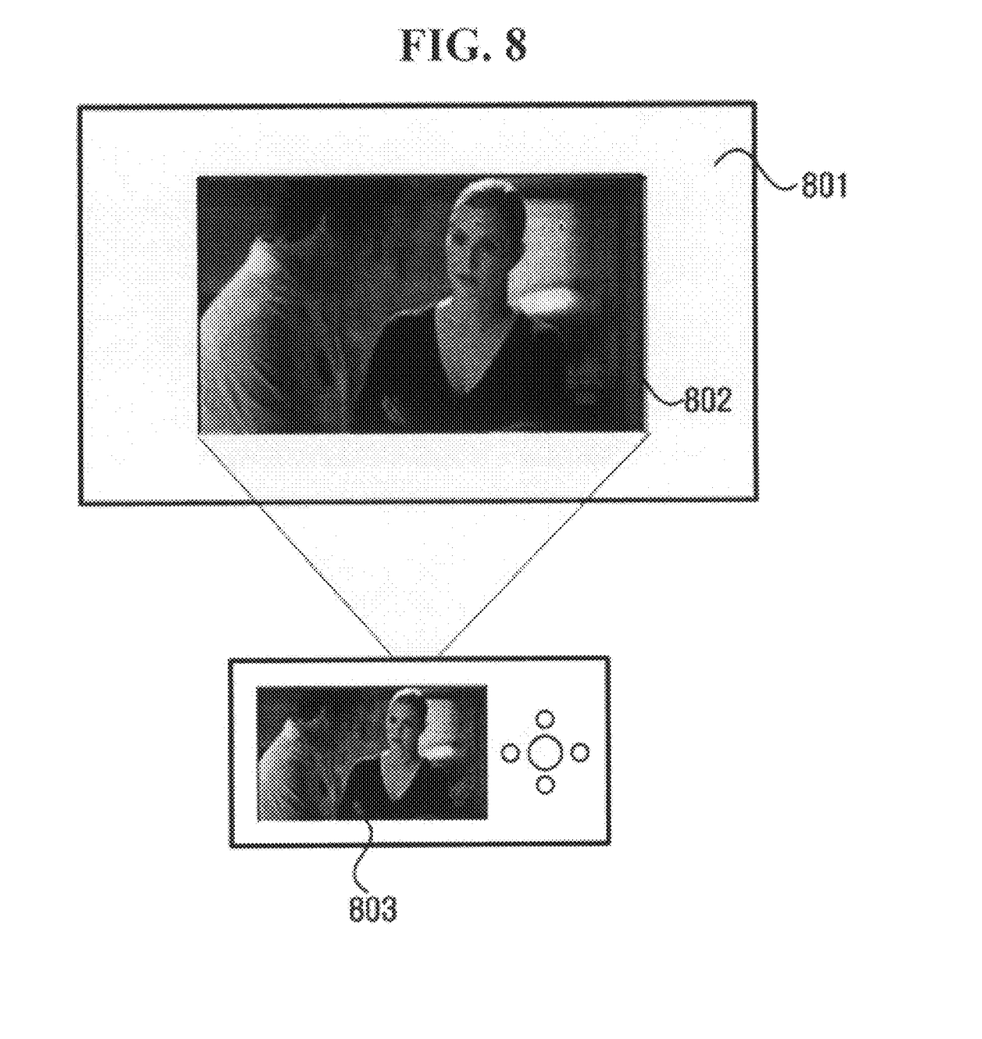
FIG. 8 illustrates an image projected onto the screen through a method according to an exemplary embodiment of the present invention.

FIG. 8 illustrates an image projected onto the screen through a method and method according to an exemplary embodiment.

As illustrated in FIG. 1, although an image was projected onto a yellow screen 801, it can be recognized that the projected image 802 has a quality that is substantially close to an original image 803 without being distorted due to the yellow screen 801.

As described above, the apparatus and method for providing image-correction function in a projector of the exemplary embodiments may produce one or more of the following effects.

An image with substantially consistent picture quality between the screen in the original image may be produced by correcting the image depending on the state of the screen.

The exemplary embodiments of the present invention have been described for illustrative purposes, and those skilled in the art will appreciate that various modifications, additions and substitutions are possible without departing from the scope and spirit of the invention as disclosed in the accompanying claims. Therefore, the scope of the present invention should be defined by the appended claims and their legal equivalents.

What is claimed is:

1. An apparatus for providing image-correction in a projector, the apparatus comprising:
   an image-inputting module which receives a photographed image of a surface on which an image is to be projected;
   an image-analyzing module which analyzes an input state of the surface based on the received photographed image and calculates a color difference as a correction amount;
   an image-correcting module which applies the correction amount to the image to be projected onto the surface based on the calculated color difference; and
   an image-projecting module which projects the corrected image onto the surface.

2. The apparatus of claim 1, further comprising a camera module which photographs the surface.

3. The apparatus of claim 1; further comprising an image-inputting interface module to which the image is input from at least one of an inner storage device and an external device.

4. The apparatus of claim 1, wherein the image-inputting module receives an image of the surface, wherein the surface is scanned by at least one of a built-in camera and an external camera.

5. The apparatus of claim 1, wherein the input state comprises color information of the surface.

6. The apparatus of claim 5, wherein the color information comprises coordinates information of the surface and at least one of red, green, and blue color components on the coordinates.

7. The apparatus of claim 5, wherein the image-analyzing module calculates a difference between color information of a standard and color information of the surface as a correction amount.

8. The apparatus of claim 1, wherein the surface comprises a screen.

9. The apparatus of claim 1, wherein the correction amount is applied based on:

$$C = VP + E$$

$$C = \begin{vmatrix} C_R \\ C_G \\ C_B \end{vmatrix},$$

$$V = \begin{vmatrix} V_{RR} & V_{RG} & V_{RB} \\ V_{GR} & V_{GG} & V_{GB} \\ V_{BR} & V_{BG} & V_{BB} \end{vmatrix},$$

$$P = \begin{vmatrix} P_R \\ P_G \\ P_B \end{vmatrix},$$

$$E = \begin{vmatrix} E_R \\ E_G \\ E_B \end{vmatrix}$$

wherein C is a correction target image, P is an image projected from the image-projecting module, V is a color mixture determinant, E is an environment light, and E is obtained when P is 0.

10. A method of providing image-correction, the method comprising:
receiving a photographed image of a surface to which an image is projected;
analyzing an input state of the surface and calculating a color difference as a correction amount based on the received photographed image;
applying the correction amount to the image to be projected onto the surface to generate a corrected image based on the calculated color difference; and
projecting the corrected image onto the surface.

11. The method of claim 10, further comprising photographing the surface.

12. The method of claim 10, further comprising receiving the image from at least one of an inner storage device and an external device.

13. The method of claim 10, wherein the reception of the image of the surface comprises receiving the image of the surface from at least one of a built-in camera and an external camera.

14. The method of claim 10, wherein a state of the surface comprises color information of the surface.

15. The method of claim 14, wherein the color information comprises coordinates information of the surface and at least one of red, green, blue color components on the coordinates.

16. The method of claim 14, wherein the analyzing image extracts the difference between color information of a standard and color information of the surface as a correction amount.

17. The method of claim 10, wherein applying comprises applying the correction amount based on:

$$C = VP + E$$

$$C = \begin{vmatrix} C_R \\ C_G \\ C_B \end{vmatrix},$$

$$V = \begin{vmatrix} V_{RR} & V_{RG} & V_{RB} \\ V_{GR} & V_{GG} & V_{GB} \\ V_{BR} & V_{BG} & V_{BB} \end{vmatrix},$$

$$P = \begin{vmatrix} P_R \\ P_G \\ P_B \end{vmatrix},$$

$$E = \begin{vmatrix} E_R \\ E_G \\ E_B \end{vmatrix}$$

wherein C is a correction target image, P is an image projected from the image-projecting module, V is a color mixture determinant, E is an environment light, and E is obtained when P is 0.

18. A non-transitory computer-readable medium configured to store instructions for performing a method of providing image-correction, the method comprising:
receiving a photographed image of a surface to which an image is projected;
analyzing an input state of the surface and calculating a color difference as a correction amount based on the received photographed image;
applying the correction amount to the image to be projected onto the surface to generate a corrected image based on the calculated color difference; and
projecting the corrected image onto the surface.

19. The non-transitory computer readable medium of claim 18, further comprising photographing the surface.

20. The non-transitory computer readable medium of claim 18, further comprising receiving the image from at least one of an inner storage device and an external device.

21. The non-transitory computer readable medium of claim 18, wherein the reception of the image of the surface comprises receiving the image of the surface from at least one of a built-in camera and an external camera.

22. The non-transitory computer readable medium of claim 18, wherein a state of the surface comprises color information of the surface.

23. The non-transitory computer readable medium of claim 18, wherein the correction amount is applied based on:

$$C = VP + E$$

$$C = \begin{vmatrix} C_R \\ C_G \\ C_B \end{vmatrix},$$

$$V = \begin{vmatrix} V_{RR} & V_{RG} & V_{RB} \\ V_{GR} & V_{GG} & V_{GB} \\ V_{BR} & V_{BG} & V_{BB} \end{vmatrix},$$

$$P = \begin{vmatrix} P_R \\ P_G \\ P_B \end{vmatrix},$$

$$E = \begin{vmatrix} E_R \\ E_G \\ E_B \end{vmatrix}$$

wherein C is a correction target image, P is an image projected from the image-projecting module, V is a color mixture determinant, E is an environment light, and E is obtained when P is 0.

* * * * *